(12) United States Patent
Rodriguez Moreno

(10) Patent No.: US 9,360,668 B2
(45) Date of Patent: Jun. 7, 2016

(54) DYNAMICALLY CALIBRATED HEAD-UP DISPLAY

(71) Applicant: Continental Automotive Systems, Inc., Auburn Hills, MI (US)

(72) Inventor: Jorge Arturo Rodriguez Moreno, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 9 days.

(21) Appl. No.: 14/453,943

(22) Filed: Aug. 7, 2014

(65) Prior Publication Data

US 2016/0041386 A1   Feb. 11, 2016

(51) Int. Cl.
   *G02B 27/01* (2006.01)
   *B60R 1/00* (2006.01)
   *G06T 7/00* (2006.01)
   *G09G 5/10* (2006.01)
   *G06F 3/01* (2006.01)

(52) U.S. Cl.
   CPC ............. *G02B 27/0101* (2013.01); *B60R 1/00* (2013.01); *G06F 3/017* (2013.01); *G06T 7/004* (2013.01); *G09G 5/10* (2013.01); *B60R 2300/205* (2013.01)

(58) Field of Classification Search
   CPC .. G03B 27/01; G02B 27/0101; H04N 5/7491; G01C 21/26; G01C 21/365; G09G 2380/10; G09G 5/10; B60K 2350/2052; B60R 2300/205; B60R 25/31; B60R 1/00; B60R 2300/402; G06F 3/017; G06T 7/004
   See application file for complete search history.

(56) References Cited

U.S. PATENT DOCUMENTS

| | | | |
|---|---|---|---|
| 8,395,529 B2 | 3/2013 | Seder et al. | |
| 8,427,395 B2 | 4/2013 | Seder et al. | |
| 2010/0253593 A1 | 10/2010 | Seder et al. | |
| 2010/0253602 A1 | 10/2010 | Szczerba et al. | |
| 2012/0050138 A1 | 3/2012 | Sato et al. | |
| 2013/0044138 A1* | 2/2013 | Koga | B60K 35/00 345/672 |
| 2013/0113975 A1* | 5/2013 | Gabris | G03B 17/54 348/333.1 |
| 2014/0218268 A1* | 8/2014 | Olesen | B60K 35/00 345/7 |

\* cited by examiner

*Primary Examiner* — Premal Patel

(57) ABSTRACT

A head-up display system includes a display unit including a projection unit configured to be positioned adjacent to a windshield, a display screen, and a controller. The projection unit is operable to project a current image generated by the controller onto a display screen. A position sensor is electrically coupled to the display unit and is operable to detect a position of an object with respect to the display unit. The controller is configured to dynamically update the current image based upon the position. A method of detecting an object is also disclosed.

16 Claims, 4 Drawing Sheets

DYNAMICALLY CALIBRATED HEAD-UP DISPLAY

BACKGROUND

The present disclosure relates to head-up displays (HUD), and more particularly, to a head-up display with dynamic calibration.

Modern vehicles typically include a head-up display in a passenger cabin to communicate information to an operator of the vehicle. The information can include a vehicle condition such as a fuel level or velocity of the vehicle, as well as warning icons, known as tell-tales. Typical head-up displays project an image including the information onto a predetermined area of a display screen adjacent to a windshield. The windshield generally includes a curvilinear cross section profile.

Vehicles are designed to accommodate occupants of various physical dimensions and postures. The head-up display is typically installed in the vehicle by the original equipment manufacturer (OEM) during assembly of the vehicle. The OEM may define the predetermined area for displaying the content based on human factors analysis (HFA) of a typical driver or by another conventional technique. Typical head-up displays generate an image based on the geometry of the display screen at the predetermined area. The HUD projection is estimated and adjusted (calibrated) in the manufacturing line where the car is assembled, so the projected image fits that curvilinear section of the windshield.

The vehicle, however, may be operated by a driver whose physical features may deviate from the typical driver. During operation of the vehicle, the driver routinely views different areas of the windshield. Therefore, it is desirable to have a head-up display that can accommodate different occupants during operation of the vehicle.

SUMMARY

A disclosed head-up display system includes a display unit including a projection unit configured to be positioned adjacent to a windshield, a display screen, and a controller. The projection unit is operable to project a current image generated by the controller onto a display screen. A position sensor is electrically coupled to the display unit and is operable to detect a position of an object with respect to the display unit. The controller is configured to dynamically update the current image based upon the position of the object.

A disclosed method of calibrating a head-up display includes providing a display screen, detecting a position of an object with respect to the display screen, and dynamically updating a current image projected onto the display screen based upon the position of the object.

Although the different examples have the specific components shown in the illustrations, embodiments of this disclosure are not limited to those particular combinations. It is possible to use some of the components or features from one of the examples in combination with features or components from another one of the examples.

The various features and advantages of this disclosure will become apparent to those skilled in the art from the following detailed description. The drawings that accompany the detailed description can be briefly described as follows.

DETAILED DESCRIPTION

Figure 1:
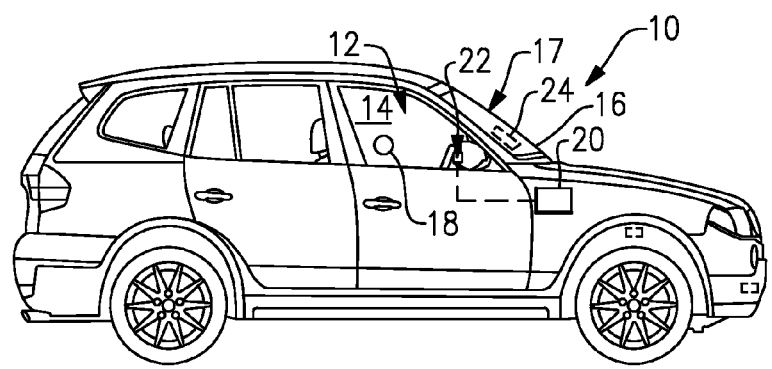
FIG. 1 schematically illustrates a vehicle including a head-up display system.

FIG. 1 schematically illustrates a vehicle 10 that can include a head-up display (HUD) system 12 for providing information or content to an occupant 18. The head-up display system 12 can be positioned, for example, within a passenger cabin 14 of the vehicle 10, and in some examples, in front of a steering wheel. The head-up display system 12 is operable to display information or context in the form of one or more images or graphics. For instance, the content can include one or more conditions of the vehicle 10, such as fuel level, battery level, odometer readings, velocity or a warning. In other examples, the head-up display system 12 is a multimedia device operable to display content in the form of navigational data, imagery, radio data or a menu for interacting with another system of the vehicle 10 or another system located remotely from the vehicle 10. However, other content is contemplated.

The head-up display system 12 can be in electrical communication, being wired or wirelessly, with another digital system onboard the vehicle 10, such as a backup guidance camera or a vehicle controller 20 operable to perform various system tasks. In other examples, the head-up display system 12 displays information from a remote system, such as information based on a location of the vehicle 10 including an advertisement provided by a commercial entity. The head-up display system 12 can also be a stand-alone system. Other systems may benefit from the teachings herein, including other ground-based systems, aircraft systems, handheld mobile devices and other computing devices. In some examples, the head-up display system 12 is operable to replicate or mirror the display contents of a computing device such as a mobile device or a smartphone.

Figure 2:
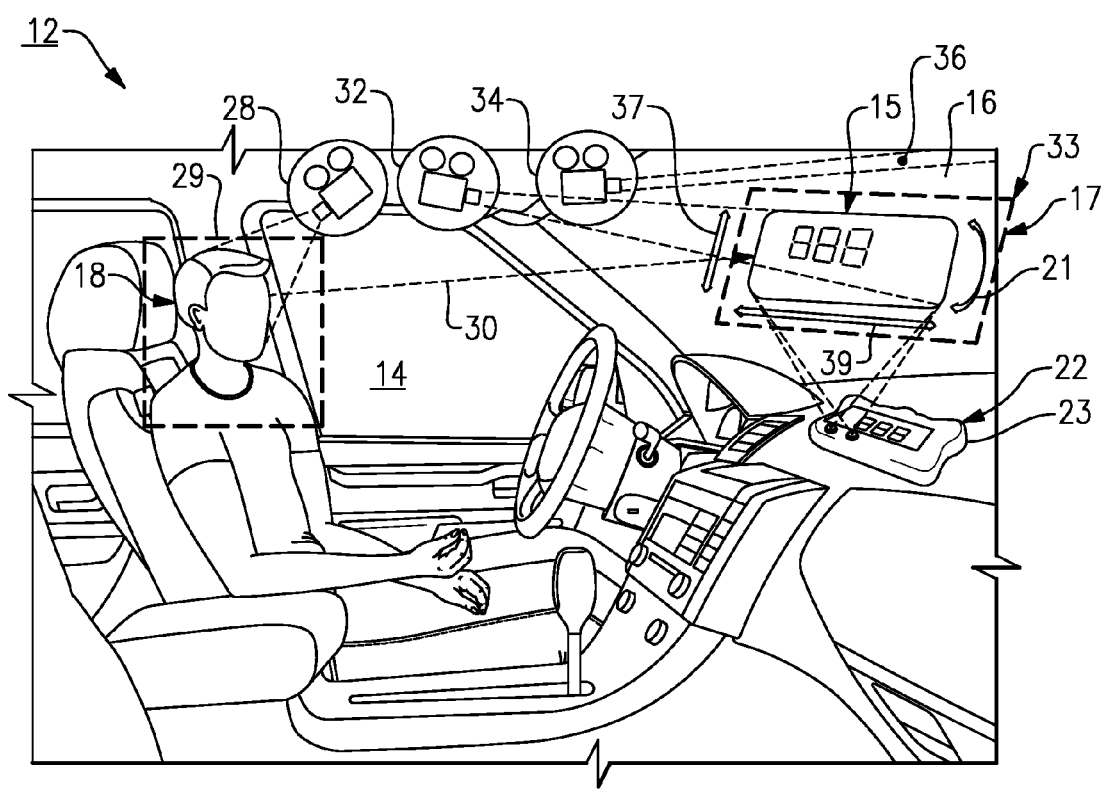
FIG. 2 schematically illustrates a perspective view of vehicle compartment including an exemplary head-up display system.
Figure 3:
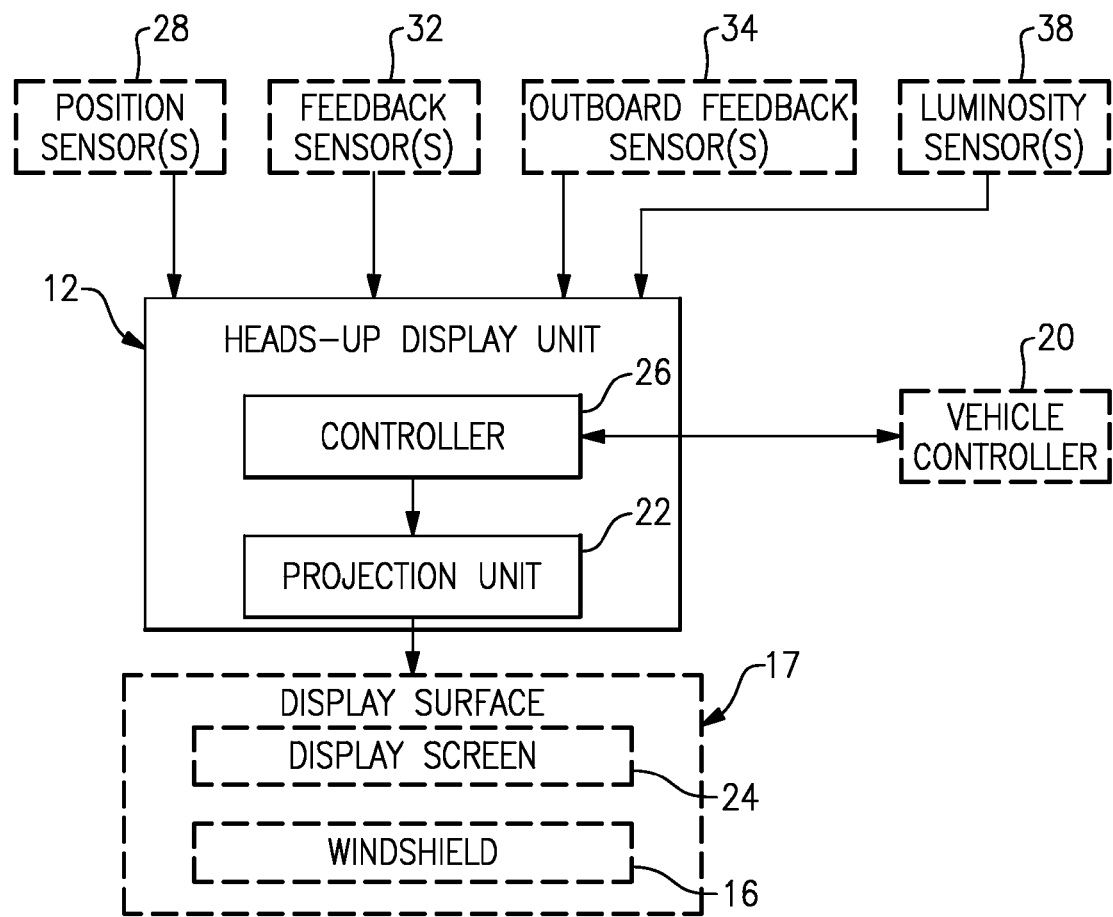
FIG. 3 is a schematic view of the head-up display system of FIG. 2.

FIG. 2 illustrates a schematic view of the head-up display system 12 located in the passenger cabin 14, and FIG. 3 illustrates a highly schematic view of the head-up display system 12. The head-up display system 12 is operable to project an image 15 presenting the information or content onto a display surface 17 of the vehicle 10. The head-up display system 12 includes a projection unit 22 positioned adjacent to the windshield 16 for projecting the image 15 onto the display surface 17 of the vehicle 10. The image 15 is projected onto the display surface 17 at a location or area that is observable by the occupant 18 or operator of the head-up display system 12. In some examples, the projection unit 22 includes one or more mirrors to adjust a focus of the image 15 as is known.

The display surface 17 can include any suitable surface for projecting the current image 15. The display surface 17 presenting the image 15 to the occupant 18 may be provided by the windshield 16, a film or other layer overlaying or integrated into windshield, or a conventional display screen 24 (shown schematically in FIG. 1) positioned adjacent to the windshield 16. In some examples, the display screen 24 is integrated or formed with, or otherwise conforms to, a geometry of the windshield 16. The display screen 24 can be arranged within a region of the windshield 16, or can even span the entire windshield 16. It should be appreciated that the display surface 17 can be any suitable surface for projecting the current image 15 onto, including a side window of the vehicle 10 or a remote screen.

The physical geometry of the display surface 17 may cause undesirable distortion of the image 15 being projected onto the display surface 17. For example, the windshield 16 or display screen 24 can include a generally curvilinear or concave cross section profile. Distortion may also occur as a location of the content changes in a vertical or horizontal direction within the image 15, or when a location of the image 15 changes in a vertical or horizontal direction across the display surface 17.

The head-up display system 12 includes or interfaces with at least one position sensor 28 operable to detect a position of the occupant 18 relative to the head-up display system 12 or the position sensor 28. The position of the occupant 18 can be defined at a static location, such as during installation of the head-up display system 12 or design of the vehicle 10, or may be changed dynamically during operation of the vehicle 10. The position sensor 28 can be positioned in front of, behind, or to a side of the occupant 18 within the passenger cabin 14. For example, the position sensor 28 can be attached to a static structure of the vehicle 10, such as a dash, console, ceiling or pillar of the vehicle 10. In other examples, the position sensor 28 can be located in or attached to a housing 23 of the head-up display system 12. Of course, the particular location, quantity and type of position sensor 28 can be determined based upon the design parameters of the skilled artisan in view of the teachings herein.

In some examples, the position sensor 28 is a proximity sensor operable to detect a distance of the occupant 18 from the position sensor 28 or from the display screen 24. In other examples, the position sensor 28 is a digital camera operable to generate a position image including the occupant 18. In further examples, the head-up display system 12 includes a combination of proximity sensors and digital cameras. However, other conventional sensors operable to detect a position of the occupant 18 are contemplated.

The head-up display system 12 includes a controller 26 (shown schematically in FIG. 3) operable to generate the image 15. The controller 26 can be located within the housing 23 or another suitable location. The controller 26 is electrically coupled, either wired or wirelessly, to the projection unit 22 to command the projection unit to project the image 15 onto the display surface 17. The controller 26 can generate the image 15 to include content or information provided by another system such as the vehicle controller 20. In other examples, the controller 26 is operable to generate one or more images 15 to include content or information from multiple data sources.

The controller 26 is operable to dynamically calibrate or update an aspect of the current image 15 based on a position of the occupant 18. The controller 26 is electrically coupled to each position sensor 28 to obtain data corresponding to the position of the occupant 18. In some examples, the controller 26 is programmed with at least one conventional image recognition algorithm or library to detect a feature within a position image 29 provided by the position sensor 28. These libraries, for example, may allow the controller 26 to detect one or more facial feature of the occupant 18 within the position image 29. In some examples, the controller 26 is operable to calculate a distance and view angle of the occupant 18 relative to the head-up display system 12. Of course, other features of the occupant 18 may be detected, such as a mouth, eyes, head, torso or appendage of the occupant 18.

In some examples, the controller 26 is operable to dynamically customize an aspect of the current image 15, such as an offset of a default location of the current image 15 projected onto the display surface 17. The controller 26 can be operable to store a profile or data entry for each unique occupant 18. Each profile can be accessed during operation of the vehicle to define or adjust an aspect of the current image 15, including a location of the current image 15 on the display surface 17. Upon being presented with an occupant 18 in the first instance, the controller 26 can generate a profile including default position information for projecting the current image 15 onto the display surface 17. The profile may be generated based upon a height and eye position of the occupant 18, for example. The occupant 18 may customize an aspect of the current image 15, by adjusting or offsetting the default location of the current image 15 to a more desirable location. Other features of the current image 15, such as contrast, sharpness or filtering, may also be customized and stored in the profile of the occupant 18. The occupant 18 may interface with, or be identified by, the controller 26 to customize the profile in a number of ways, including for example a touchscreen or button located on the head-up display system 12, audio or voice recognition, facial recognition by utilizing data from a position image 29, or a key fob corresponding to the occupant 12. However, other ways of interfacing with the controller 26 to customize a profile are contemplated.

In some examples, the controller 26 is operable to calculate a vector 30 extending from a position of the occupant 18 and intersecting a spatial representation of the display surface 17. It should be appreciated that the vector 30 originates from a three dimensional spatial point and can extend to any point or region on the display surface 17. The vector 30, in some examples, represents a calculated or simulated perspective view of the occupant 18 as the occupant is arranged in the vehicle 10 or passenger cabin 14. By way of the illustration, the controller 26 may determine that the occupant 18 is looking directly forward through the windshield 16 during one time period, and looking left of center in a subsequent time period, such as when a head of the occupant 18 begins to rotate to check a side mirror of the vehicle 10. In some examples, the controller 26 commands the projection unit 22 to adjust a focus of the image 15 based on the vector 30, such as when the occupant 18 focuses from the display surface 17 to a location external to the vehicle 10. In other examples, the controller 26 includes an algorithm to adjust a focus of the image 15 based on the vector 30. In further examples, the controller 26 may interface with a vehicle detection system to obtain data corresponding to an oncoming vehicle or obstacle. The controller 26 can is operable to adjust the content of the current image 15 to include an icon, graphic, warning or other information to indicate the detection of an oncoming vehicle or obstacle, and for example, an oncoming vehicle from a rear of the vehicle 10. Other information such as such as distance and a relative direction of the oncoming vehicle or obstacle may also be presented.

The controller 26 can be operable to command the projection unit 22 to change a location of the current image 15 projected onto the display surface 17 based on a position of the occupant 18, such as vertically in direction 37 and horizontally in direction 39. For example, a location of the current image 15 moves vertically in direction 37 corresponding to a height of the occupant 18 or horizontally in direction 39 corresponding to the position or posture of the occupant 18 within a seat of the vehicle 10. In another example, presentation of the content of the image 15 changes within the image 15 based on a position of the occupant 18, in response to position information provided by the position sensor 28. For example, a position of a fuel level indicator graphic could move vertically in response to the height of the occupant 18. In some examples, the location of the current image 15 is based upon the vector 30. The controller 26 can be programmed with one or more mathematical models, including a 3D graphics library to generate graphics based on a position of the occupant 18, and one or more libraries for occupant detection. It should be appreciated that the controller 26 can be programmed to execute other mathematical or graphics models to calculate the position of the occupant 18 within the passenger cabin 14.

Figure 4:
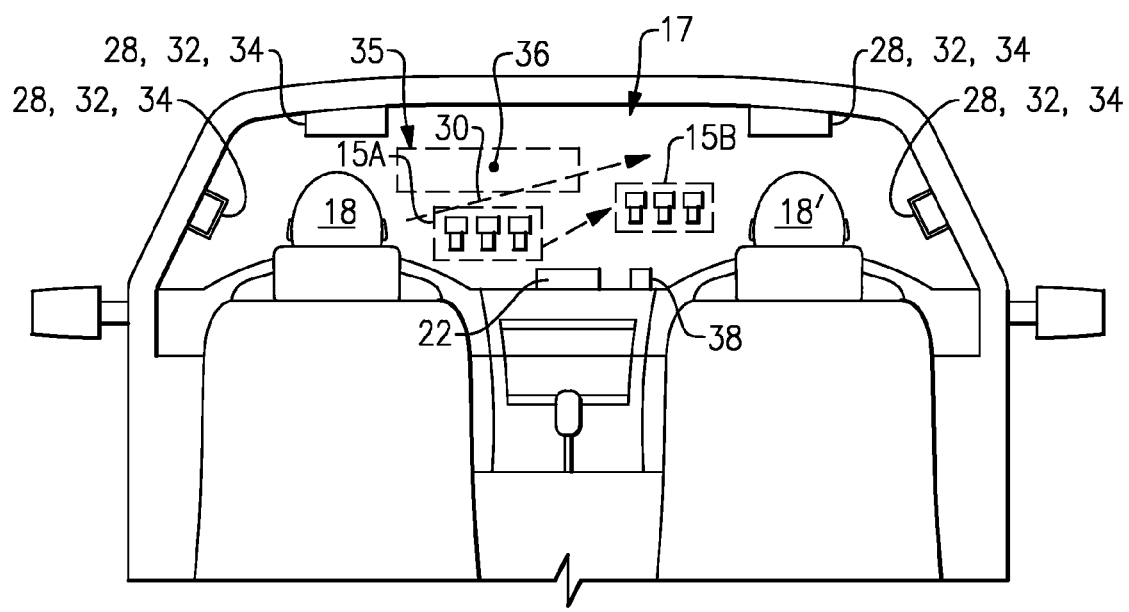
FIG. 4 is a schematic rear view of the vehicle compartment of FIG. 2.

FIG. 4 illustrates one non-limiting example of the current image 15 being responsive to a position of the occupant 18. In this example, the controller 26 commands the projection unit 22 to move a projection of the current image 15A to next image 15B at another relative location on the display surface 17, based upon a location of the occupant 18 or the vector 30, for example. Of course, movement of the current image 15 or its content may cause distortion in the horizontal and/or vertical directions 37, 39.

In further examples, controller 26 is configured to duplicate the content of current image 15A to current image 15B so that current image 15A is independently calibrated or compensated for the point of view or perspective of occupant 18 such as a driver, and current image 15B is independently calibrated or compensated for the to the point of view of occupant 18' such as a co-pilot. The controller 26 can also be operable to duplicate or share only a portion of the content of current image 15A, such as navigational data. For example, current image 15A may present occupant 18 with instrumentation and navigation data, and current image 15B may present occupant 18' with video data and also the navigation data presented in current image 15A. In yet other examples, the controller 26 is operable to generate different content for each of current images 15A, 15B to be presented to the occupants 18 and 18', respectively. It should be appreciated that the same sensors 28, 32 or different sensors 28, 32 can be used for the occupants 18, 18'.

The controller 26 is operable to minimize distortion of the image 15. A spatial model of the display surface 17 is stored within a memory of the controller 26. The controller 26 can execute the mathematical models to adjust the current image 15 to conform to the geometry of the display surface 17 where the current image 15 is to be projected onto. The controller 26 may correct the current image 15 in a direction 21, for example, to compensate for skew, stretch or tilt of the current image 15 due to the position of the occupant 18 or the projection of the current image 15 from the projection unit 22 onto the display surface 17. Accordingly, the occupant 18 is able to more easily observe the current image 15 in a suitable location during operation of the vehicle 10 and without distortion of the content or information.

In some examples, the head-up display system 12 includes or interfaces with a feedback sensor or display feedback camera 32 electrically coupled to the controller 26 to calibrate or minimize distortion of the current image 15. The display feedback camera 32 can be located at any position previously mentioned for the position sensor 28, such as any of the locations shown in FIG. 4, or any other suitable location. The display feedback camera 32 is operable to generate a display feedback image 33 including the current image 15 and other portions of the display surface 17. The controller 26 is operable to compare a theoretical representation of the current image 15, based on the spatial model of the display surface 17 based on the position of the occupant 18, for example, to the display feedback image 33. The controller 26 dynamically updates the current image 15 to adjust the location of the projection of the current image 15 or otherwise minimizes any distortion. Accordingly, the current image 15 is dynamically updated to compensate for the geometry of the display surface 17 providing a more desirable presentation of the content or information to the occupant 18.

In some examples, the controller 26 is configured to dynamically adjust the current image 15 in response to detecting an obstruction within the display feedback image 33. During operation of the vehicle 10, content such as a warning icon or tell-tale may be located in a "dead spot" or visibly obstructed location on the display surface 17 with respect to the occupant 18. The dead stop could a steering wheel positioned between the occupant 18 and warning icon, for example. The controller 26 can be configured to dynamically adjust a position of the content within the current image 15, or the location of the current image 15 on the display surface 17 to a visible or more desirable location. The controller 26 may estimate a dead-spot based on detecting an obstruction within the display feedback image 33 utilizing an image recognition algorithm and a spatial representation of the obstruction with respect to the display screen 17. In another example, the controller 26 may estimate a dead-spot based on a comparison of the current image 15 projected onto the display surface 17 and a representation of the current image 15 captured by the display feedback image 33. However, the controller 26 may be programmed to utilize other conventional techniques to identify a dead-spot.

During operation of the vehicle 10, visibility of the current image 15 may be degraded due to glare or shading of the display surface 17. Degradation of the current image 15 may be caused by ambient light from the sun, for example. The controller 26 can be configured to dynamically update a luminescence of the current image 15 based on the feedback image 33 or data from a conventional luminosity sensor 38 arranged adjacent to the display surface 17 (shown in FIG. 3). The controller 26 adjusts a contrast of the current image 15 or selected portions of the current image 15 when the environment lighting is not uniform on the display surface 17.

In other examples, the head-up display system 12 can include one or more interfaces to an outboard feedback sensor or camera 34 operable to detect information of an area other than the display surface 17, such as an operating environment of the vehicle 10. The information may include, for instance, a road surface or other objects surrounding the vehicle 10 during operation. The outboard feedback camera 34 is electrically coupled to the controller 26 and is operable to generate an outboard feedback image 35 (shown schematically in FIG. 4) corresponding to a focal point 36 (shown in FIGS. 2 and 4) spaced axially outward from the display surface 17. In some examples, the outboard feedback camera 34 is located within or attached to the housing 23 of the head-up display unit 22. In other examples, the outboard feedback camera 34 is located remotely from the housing 23 and can be even be located outside the passenger cabin 14.

The controller 26 is configured to dynamically update the current image 15 based upon the outboard feedback image 35. In some examples, the controller 26 is configured to dynamically update the current image 15 in response to detecting a feature within the outboard feedback image 35 utilizing the image recognition algorithms. The feature may be, for instance, line markers of a road surface from which the vehicle 10 is being operated on. The feature may include another object surrounding the road surface or obstacles such as pedestrians, trees, guardrails or other vehicles. The controller 26 can update the current image 15 to include a depiction of the objects detected within the outboard feedback image 35. In other examples, the controller 26 augments the current image 15 with information relating to the feature, such as a warning, speed limit, or an illuminated depiction of a road sign. In some examples, the controller 26 is configured to dynamically augment advertising content within the current image 15 based upon information provided via a remote server network. The advertising content can be provided based upon a current location of the vehicle 10 and/or an orientation of the occupant 18 relative to the head-up display system 12, for example.

Figure 5:
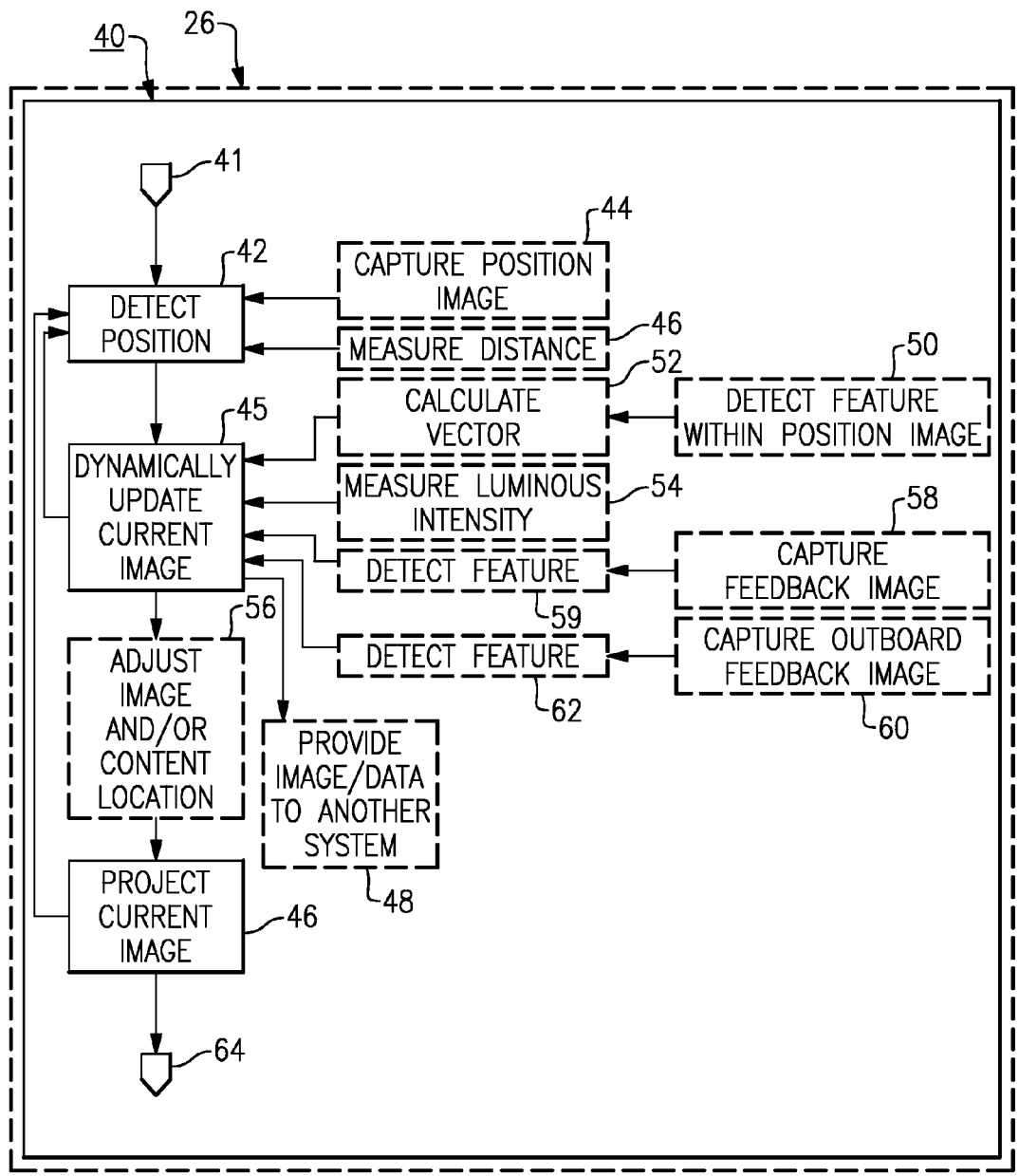
FIG. 5 is a flowchart of a calibration algorithm for a head-up display.

With reference to FIG. 5, operation of a head-up display system 12 may be performed through a calibration algorithm 40 which controls, for example, the calibration of the current image 15 based on the position of the occupant 18. The functions of the calibration algorithm 40 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment such as a controller 26, or a combination thereof. Of course, the calibration algorithm 40 may be utilized for another systems or devices than the head-up display system 12.

In the illustrative example, the calibration algorithm 40 controls functions 41-64. Upon system initialization at step 41, the algorithm 40 then moves to detecting a position or distance of an object or occupant 18 with respect to the display surface 17 at step 42. A position image 29 can be captured by one or more position sensors 28 at step 44. A distance of the occupant 18 can be measured from one or more distance sensors 28 at step 46.

A current image 15 is dynamically updated at step 45. In some examples, a feature of the occupant 18 is detected within the position image 29 at step 50. Thereafter, a vector 30 may be calculated from the feature of the occupant 18 detected within the position image 29. A luminous intensity of the display surface 17 receiving the current image 15 can be measured at step 54, which can be utilized to adjust a contrast of the current image 15. At step 58 a feedback image 33 can be captured by a display feedback camera 32. A feature can be detected within the feedback image 33 at step 59. At step 60, an outboard feedback image 35 can be captured by an outboard feedback camera 34. A feature can be detected within the outboard feedback image 35 at step 62.

At step 56 a desired location of the current image 15 on the display surface 17 or contents within the current image 15 may be adjusted. The location may be dynamically adjusted in response to detecting an obstruction within the display feedback image 33. The current image 15 is then projected by a projection unit 22 onto a location of the display surface 17 at step 46. The current image 15, position data and/or feedback data may be provided to another system, such as a vehicle or system controller 20 at step 48. The calibration algorithm 40 repeats functions 42-62 until the calibration algorithm 40 terminates at step 64.

In some examples, the calibration algorithm 40 is utilized by an original equipment manufacturer (OEM) or vehicle designer to inform the human factors analysis (HFA) or another conventional technique. The OEM can utilize the calibration algorithm 40 to define the location of components of a head-up display system 12 or to calibrate images to be generated by the head-up display system 12. This technique, for example, can adjust the images to accommodate vehicles 10 having windshields 16 with different geometries or different passenger cabin 14 arrangements. The calibration algorithm 40 may be utilized to define a predetermined location or area of the display surface 17 within the passenger cabin 14. Accordingly, the head-up display system 12 and calibration algorithm 40 can reduce design, integration and manufacturing costs associated with integration of the head-up display system 12 into the vehicle 10.

The controller 26 typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the calibration algorithm 40 for operation of the head-up display system 12 as described herein. The interface facilitates communication with the other systems or components of the vehicle 10. In some examples, the controller 26 may be a portion of the vehicle control 20, another system, or a stand-alone system.

The head-up display system 12 disclosed herein provides many benefits during integration of the head-up display system 12 into the vehicle 10 and also during operation of the vehicle 10. Obtaining position information of the occupant 18 with respect to the display surface 17 allows the current image 15 to be defined at a predetermined location suitable for a typical occupant 18, or updated dynamically to provide information at a suitable location during operation of the vehicle 10. The head-up display system 12 can dynamically correct distortion that may be caused by a particular geometry of the display surface 17. The luminosity of the current image 15 can be dynamically updated to provide a more desirable image to the occupant 18 while operating the vehicle 10. Further, no special hardware or mechanical features are required for using the head-up display system 12 in different vehicles 10 provided by the OEM. This allows accelerated integration of the head-up display system 12 into a particular vehicle 10, whereas in some conventional head-up display modules mechanical adjustment for projection may be limited. Also, a controller 26 can be operable to make precise adjustments or calibrations based upon a software solution rather than a mechanical solution which may increase the overall cost of the head-up display system 12 or vehicle 10.

It is also contemplated that there can be more than one head-up display units 12 within each vehicle 10 or more than one contiguous or non-contiguous display surface 17. The head-up display system 12 can include any number of position sensors 28, 32, 34, 38 and can be located at any suitable location. The head-up display system 12 can be a separate unit from any of the sensors 28, 32, 34, 38. The sensors 28, 32, 34, can be hard-coupled to the controller 26 or can be provided by a wireless communication as is known in the art.

Although the different examples have a specific component shown in the illustrations, embodiments of this disclosure are not limited to those particular combinations. It is possible to use some of the components or features from one of the examples in combination with features or components from another one of the examples. Also, although particular step sequences are shown, described, and claimed, it should be understood that steps may be performed in any order, separated or combined unless otherwise indicated and will still benefit from the present disclosure.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A head-up display system comprising:
a display unit including a projection unit configured to be positioned adjacent to a windshield, a display screen, and a controller, the projection unit being operable to project a current image generated by the controller onto the display screen; and
a position sensor electrically coupled to the display unit and being operable to detect a position of an object with respect to the display unit;
wherein the controller is configured to dynamically update the current image based upon the position, the system including a display feedback camera electrically coupled to the controller and operable to generate a display feedback image corresponding to the current image projected onto the display screen, wherein the controller is configured to dynamically update the current image based upon the display feedback image, wherein the controller is configured to dynamically adjust a position of the current image in response to detecting an obstruction within the display feedback image.

2. The head-up display system as recited in claim 1, wherein the position sensor is a proximity sensor.

3. The head-up display system as recited in claim 1, wherein the position sensor is a digital camera operable to generate a position image.

4. The head-up display system as recited in claim 3, wherein the controller is configured to dynamically update the current image in response to detecting a feature within the position image.

5. The head-up display system as recited in claim 4, wherein the controller is operable to calculate a vector extending from the position and intersecting a spatial representation of the display screen.

6. The head-up display system as recited in claim 5, wherein the controller is operable to command the projection unit to change a location of the current image projected onto the display unit based upon the vector.

7. The head-up display system as recited in claim 5, wherein the controller is operable to update a content of the current image based upon the vector.

8. The head-up display system as recited in claim 1, comprising an outboard feedback camera electrically coupled to the controller and being operable to generate an outboard image, the outboard image corresponding to a focal point spaced axially from the display unit, and the controller being configured to dynamically update the current image based upon the outboard image.

9. The head-up display system as recited in claim 8, wherein the controller is configured to dynamically update the current image in response to detecting a feature within the outboard image.

10. A head-up display system comprising:
a display unit including a projection unit configured to be positioned adjacent to a windshield, a display screen, and a controller, the projection unit being operable to project a current image generated by the controller onto the display screen; and
a position sensor electrically coupled to the display unit and being operable to detect a position of an object with respect to the display unit, wherein the controller is configured to dynamically update the current image based upon the position, the system including a display feedback camera electrically coupled to the controller and operable to generate a display feedback image corresponding to the current image projected onto the display screen,
wherein the controller is configured to dynamically update a luminous intensity of the current image based upon the display feedback image.

11. The head-up display system as recited in claim 10, wherein the controller is configured to dynamically update the current image based upon the display feedback image.

12. A method of calibrating a head-up display, comprising:
providing a display screen;
detecting a position of an object with respect to the display screen, including generating a position image;
dynamically updating a current image projected onto the display screen based upon the position of the object, including detecting a feature within the position image,
generating a feedback image corresponding to the current image projected onto the display screen; and
dynamically updating the current image based upon the feedback image, including adjusting a luminous intensity of the current image based upon the feedback image.

13. The method as recited in claim 12, wherein the step of dynamically updating includes calculating a vector extending from a spatial coordinate corresponding to the feature and intersecting a spatial representation of the display screen.

14. The method as recited in claim 12, comprising the step of:
generating an outboard image corresponding to a focal point spaced from the display unit, the step of dynamically updating being based upon the outboard image.

15. The method as recited in claim 14, wherein the step of dynamically updating includes detecting a feature within the outboard image.

16. The method as recited in claim 12, wherein the step of dynamically updating includes selectively adjusting a location of the current image projected onto the display screen.

* * * * *